Patented Nov. 28, 1950

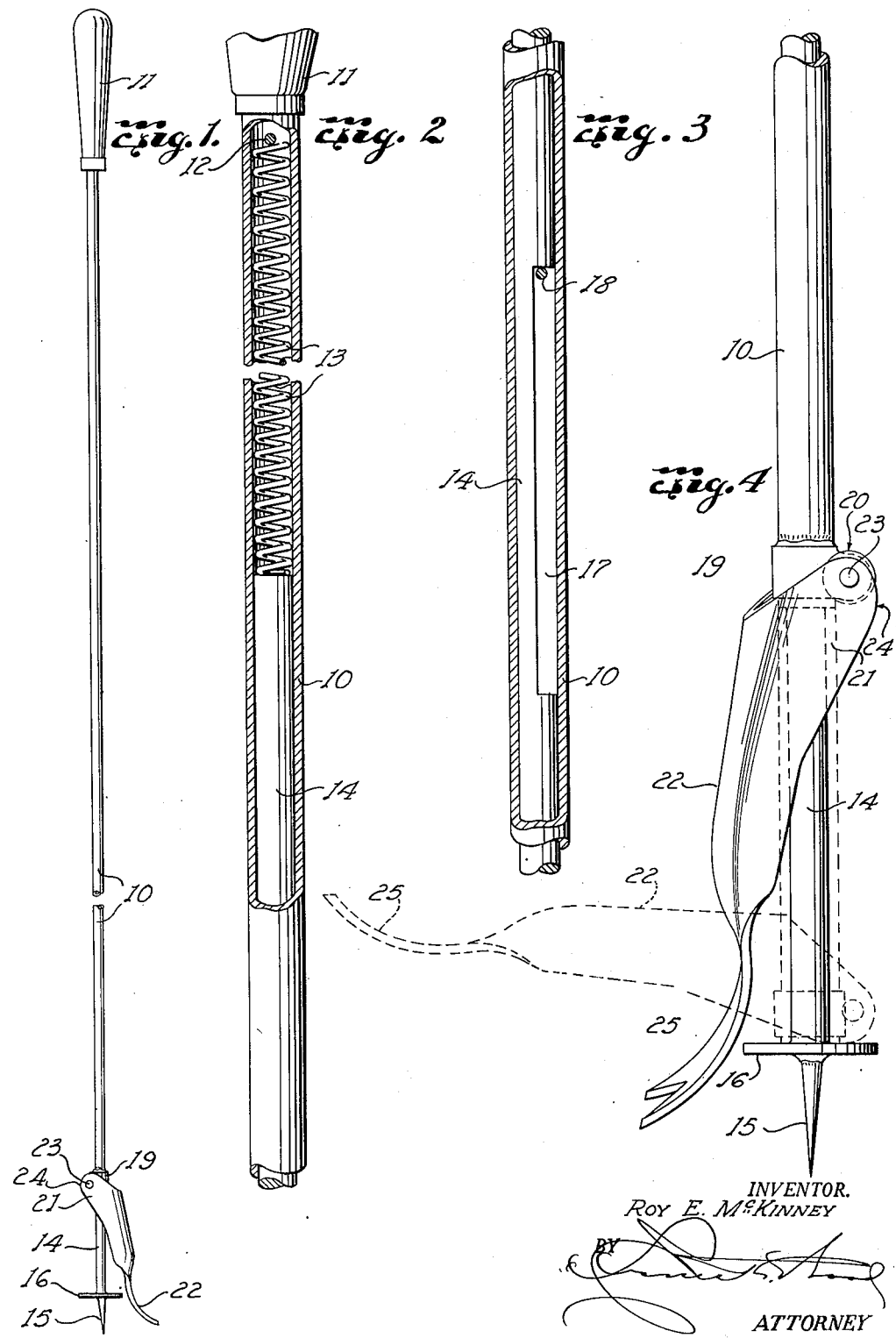

2,532,115

UNITED STATES PATENT OFFICE 2,532,115

WEED EXTRACTOR

Roy E. McKinney, Dallas, Tex.

Application April 8, 1948, Serial No. 19,801

3 Claims. (Cl. 254—132)

This invention relates to devices for eliminating noxious vegetation from lawns and gardens and more particularly to a device for extracting weeds which can be operated in a standing position.

The principal object of the invention is to provide a weed extracting or removing tool consisting of an elongated handle having a soil piercing anchor on its operative end as well as a weed engaging and extracting fork which is adapted to be operated by a downward thrust on the handle in a standing position. The peculiar characteristic of the tool resides not only in its ease of operation through the simple expedient of pressing downwardly on the handle but also in the novel design and function of the weed extracting fork, the latter being arcuated at its operative end so that its depth of soil penetration will be predetermined in order to minimize as much as possible any disturbance of vegetation in the immediate vicinity of the weed being extracted.

Another object of the invention is to provide a weed extractor consisting of but few moving parts so assembled that clogging is virtually eliminated and its operation is made simple.

With the foregoing objects in view, the invention has further reference to certain features of accomplishment which will become apparent as the description proceeds, taken in connection with the accompanying drawings wherein:

Figure 1 is a side elevational view of a weed extractor constructed according to the invention.

Figure 2 is an elevational view of the upper portion of the hollow handle, partly in longitudinal section.

Figure 3 is a continuation of Figure 2, showing the midsection of the handle in section to reveal the fork actuating plunger therein.

Figure 4 is a continuation of Figures 2 and 3, showing the lower end of the tool.

Continuing with a more detailed description of the drawing, reference is primarily made to Figures 1 to 4 wherein numeral 10 denotes a hollow shaft, to the upper end is affixed a handle 11. Within the shaft 10 adjacent its upper end is a pin 12 against which bears the upper end of a coil spring 13, the lower end of the spring abutting the upper end of a plunger rod 14 reciprocably arranged in the shaft. The plunger rod continues through the shaft, emerging at its lower end and is formed into a soil piercing point 15, above which is affixed a stop member 16 to predetermine the depth of penetration of the point 15 which constitutes the anchor for the tool.

The plunger rod 14 has a longitudinal recess 17 therein intermediate its ends and extending diametrically through the shaft 10 is a pin 18 which passes through the recess 17 and serves as a stop to limit relative displacement of the shaft on the plunger rod. When the tool is manipulated to set the anchor point 15 in the soil and pressure is imposed downwardly on the handle 11, the shaft 10 will be urged downwardly on the now stationary rod 14 until the pin 18 reaches the limit of travel of the recess 17 in the rod, compressing the spring 13 and storing therein energy which will return the parts to their original positions.

At the lower extremity of the shaft 10 is mounted as by welding or otherwise, a collar 19 (Fig. 4). This collar has a boss or ears 20 on one side thereof to which is attached the flanges 21 of a weed extracting fork 22, by means of a pivot pin 23.

It is important to observe that the rear edges of the flanges 21 of the weed fork 22 are rearwardly divergent, terminating in a lobe or radius 24, the purpose of which will be described presently. At the operative end of the fork the body thereof is flattened and arcuated as at 25 for the purpose to be explained in the description of operation to follow.

In operation, the tool is so disposed that the anchor point 15 will enter the soil at a point spaced from a weed to be extracted, with the bifurcated end of the fork located at the base of the weed. The shaft 10 will be perpendicular to the ground or nearly so and is urged vigorously downward. The point of the fork will move downwardly against the base of the weed and will penetrate the soil but slightly because the curve of the blade at 25 will guide the same outwardly and upwardly, either pulling the roots of the weed from the soil or severing the weed from the root and thrusting the same upwardly with impetus increased by engagement of the cam surface defined by the radius 24, with the circular stop 16 on the rod 14 above the anchor 15. When pressure on the shaft 10 is relieved, the spring 13 will return the same to its extended position on the plunger rod 14.

Manifestly, the construction as shown and described is capable of some modification and such modification as may be construed to fall within the scope and meaning of the appended claims is also considered to be within the spirit and intent of the invention.

What is claimed is:

1. A weed extracting tool comprising a hollow shaft having a handle on one end, a rod reciprocably disposed in said shaft having a sharpened end defining a soil anchor, a depth predetermining protuberance on said rod above said anchor, a weed engaging fork pivoted to said shaft at its lower end and having a bifurcated end adapted to penetrate the soil when a downward thrust is imposed on said shaft, said bifurcated end being curved to deflect the same from the soil, flanges on said fork adjacent its pivotal point having lobular protuberances engageable with the protuberances on said rod upon continued downward thrust of said shaft to exert an upward thrust to said fork and spring means in said shaft for normally maintaining extended relationship of said shaft and rod.

2. A weed extracting tool comprising a hollow shaft having a handle on one end thereof, a rod reciprocably disposed in said shaft having a soil anchor on one end, a coil spring in said shaft for maintaining normally extended position of said rod in relation to said shaft, a depth predetermining stop on said rod, a weed engaging member pivoted at its upper end to the lower end of said shaft and having a bifurcated operative end, the latter having a curve therein to effect its deflection from the soil when thrust thereinto by downward pressure on said shaft and means formed on the rear of said fork adjacent its pivot engageable with said depth predetermining stop for exerting an upward impetus on said fork upon continued downward thrust on said shaft.

3. A weed extractor including a hollow shaft having a handle on one end, a spring loaded rod reciprocably arranged in said shaft having a soil anchor on its extended end, an annular protuberance on said rod above said anchor providing a depth predetermining stop, a weed eroding fork pivoted to said shaft above said anchor and means on said fork adapted to engage said annular protuberance when a downward thrust is imposed on said shaft to propel said fork upwardly on its pivot.

ROY E. McKINNEY.

REFERENCES CITED

The following references are of record in the file of this patent:

UNITED STATES PATENTS

| Number | Name | Date |
|---|---|---|
| 637,091 | Cutter | Nov. 14, 1899 |
| 1,827,109 | Rice | Oct. 13, 1931 |
| 2,027,773 | Hardy | Jan. 14, 1936 |
| 2,349,621 | Hardman | May 23, 1944 |